UNITED STATES PATENT OFFICE.

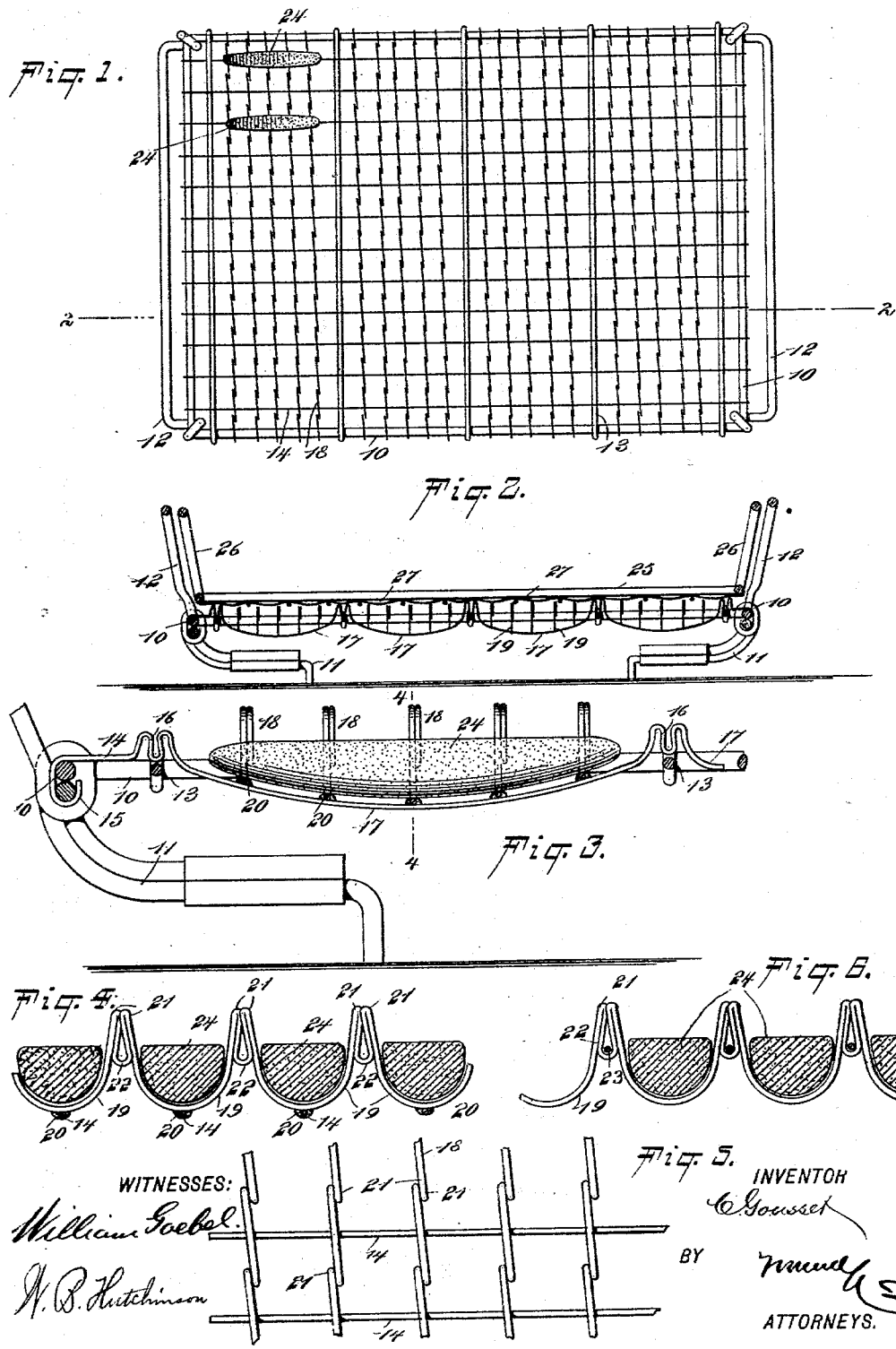

CYPRIEN GOUSSET, OF NEW YORK, N. Y.

CHOCOLATE-DIPPER.

SPECIFICATION forming part of Letters Patent No. 551,277, dated December 10, 1895.

Application filed November 10, 1894. Serial No. 528,418. (No model.)

*To all whom it may concern:*

Be it known that I, CYPRIEN GOUSSET, of New York city, in the county and State of New York, have invented a new and Improved Chocolate-Dipper, of which the following is a full, clear, and exact description.

My invention relates to chocolate-dippers and is an improvement on the apparatus shown in Letters Patent of the United States, No. 526,968, dated October 2, 1894. The apparatus shown in the patent referred to is particularly adapted for use in dipping cream drops, and the apparatus constituting my present invention is intended for use in dipping stick chocolate and other elongated forms of candy; and the object of my invention is to produce a simple and inexpensive device of this kind which may be made to fit chocolate sticks and other odd shapes and hold the sticks so that they may be readily dipped into a chocolate solution and completely covered by the same, also to produce a device capable of holding a comparatively large quantity of candy, and made of a network of wires arranged to produce open-sided baskets which are light but sufficiently strong.

To these ends my invention consists of a chocolate-dipper, the construction of which will be hereinafter described and claimed.

Reference is to be had to the accompanying drawings, forming a part of this specification, in which similar figures of reference indicate corresponding parts in all the views.

Figure 1 is a plan view of a chocolate-dipper embodying my invention. Fig. 2 is a longitudinal section on the line 2 2 of Fig. 1, showing also a cover to hold the sticks in place in the baskets of the dipper. Fig. 3 is an enlarged detail longitudinal section showing the construction of the baskets. Fig. 4 is a broken detail cross-section on the line 4 4 of Fig. 3. Fig. 5 is a broken plan view of the network forming the baskets; and Fig. 6 is a cross-section similar to Fig. 4, but illustrating a slightly-modified form of the basket.

The dipper is provided with an open frame 10, preferably of rectangular shape, which has suitable legs 11 and end bails 12, this construction being like that shown in the former patent, but the frame may be provided with any suitable support or may be of any desired shape and construction, as my present invention relates wholly to the series of pockets which are carried by the frame. These pockets are formed in a network extending across the frame and are made up of wires crossing at right angles and shaped so as to support sticks of candy or creams of various shapes, the pockets having longitudinal wires 14, which at the ends are fastened, as shown at 15, to the ends of the frame and which at intervals are bent upward and downward, so as to form pendent loops 16, which rest on the strengthening cross-bars 13 of the frame, and these bent-up portions of the wires 14 form the ends of the pockets which are adapted to contain the cream sticks, the wire between these points being bent downward, as shown at 17, so as to hang below the plane of the frame 10 and form a portion of the bottom of the pocket, as shown clearly in Figs. 2 and 3.

The pockets are also provided with numerous cross-wires 18, which are fastened to the sides of the frame 10 and are formed into a series of cross-loops 19, which rest on the wires 14, to which they are soldered, or otherwise secured, as shown at 20. These loops 19 are separated by the upwardly-extending bends 21 of the wires 18, these bent portions forming the tops of the sides of the pockets and assisting in guiding the sticks to their seats in the baskets.

Between the bends 21 are pendent loops or eyes 22 which serve to brace the loops 19, and if desired these loops may be utilized in making a slightly-modified form of dipper, in which case the wires 18 with their loops and bends are placed transversely, as already described, and are made to engage the longitudinal wires 23 which extend through the loops or eyes 22 and are fastened to the ends of the frame 10.

It will be observed from the foregoing description that a series of elongated pockets are formed, the wires of which are arranged so as to be strong and yet expose practically the entire bodies of the sticks, which they hold, to the action of the solution into which the dipper is plunged. It will also be noticed that the open loops 19 are formed at the top by the bends 21 in such a way that the sticks are very easily dropped and guided to position on the bottoms of the pockets.

In connection with the dipper a cover is used to hold the sticks in place, and this may be like the one shown in my former patent referred to and illustrated in Fig. 2 of the present case, or it may be of any approved open construction which will hold the sticks in place and permit the solution to pass through it. As shown, the cover is formed of a frame 25, which is adapted to lie upon the frame 10 and which has end bails 26 to lie between and parallel with the bails 12, and also a network 27 to extend across the top of the dipper. The bends 21 form projections on the upper face of the dipper on which the cover is supported, as seen in Fig. 2.

In using this device the sticks are placed in the several pockets, the cover placed upon them and the whole affair plunged into the solution, after which the cover is removed and the sticks may be simultaneously removed by placing a board, paper, or other article over the top of the dipper and then turning the latter and board bottom side up, before removing it, so that when removed the sticks are left lying side by side on the board.

I have shown and described a series of pockets shaped to hold sticks 24, but it will of course be understood that by making the several loops 19 wider or narrower, as necessity requires, pockets may be made of diamond or other shapes with equal facility.

Having thus described my invention, I claim as new and desire to secure by Letters Patent—

1. A chocolate dipper comprising a frame, a series of cross-wires mounted on the frame and formed into open loops aligned with each other and having their bottoms arranged at different levels, and a wire extending at angles to the cross-wires and secured to the bottoms of said open loops, substantially as set forth.

2. A chocolate dipper comprising a frame, brace wires arranged transversely thereof, series of cross wires between the brace-wires, said cross wires being formed into aligned open loops and having portions between said loops bent up above the level of the brace wires and longitudinal wires secured to the bottoms of the aligned loops, the portions of the said longitudinal wires adjacent to the brace wires being bent up above the level thereof, substantially as set forth.

3. A chocolate dipper comprising a frame, brace-wires arranged transversely thereof, series of cross-wires between the brace-wires and formed into aligned open loops the bottoms of which are at different levels, the portions of the cross-wires between said loops being bent up above the level of the brace-wires, and longitudinal wires secured to the bottoms of the aligned loops of the cross-wires, the portions of the said longitudinal wires adjacent to the brace-wires being bent up above the level thereof, substantially as set forth.

CYPRIEN GOUSSET.

Witnesses:
CHARLES H. DARROW, Jr.,
W. H. REGAN.